United States Patent
Focquet et al.

(10) Patent No.: US 6,294,604 B1
(45) Date of Patent: *Sep. 25, 2001

(54) POLYMER PROCESSING ADDITIVE HAVING IMPROVED STABILITY

(75) Inventors: Koen Focquet, Aartselaar; Greta Dewitte, Beveren, both of (BE); Stephen E. Amos, Minneapolis, MN (US)

(73) Assignee: Dyneon LLC, Oakdale, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/035,279

(22) Filed: Mar. 6, 1998

(51) Int. Cl.$^7$ .................................................. C08K 3/18
(52) U.S. Cl. .............................................................. 524/433
(58) Field of Search .................................... 524/323, 433

(56) References Cited

U.S. PATENT DOCUMENTS

| | | | |
|---|---|---|---|
| 2,968,649 | 1/1961 | Pailthorp et al. | 260/80.5 |
| 3,051,677 | 8/1962 | Rexford | 260/29.6 |
| 3,125,547 | 3/1964 | Blatz | 260/45.5 |
| 3,318,854 | 5/1967 | Honn et al. | 260/87.7 |
| 3,903,045 | 9/1975 | Chandrasekaran et al. | 260/45.75 R |
| 4,013,622 | 3/1977 | DeJuneas et al. | 260/45.95 |
| 4,062,830 * | 12/1977 | Ceccato | 525/326.3 |
| 4,325,863 | 4/1982 | Hinsken et al. | 624/111 |
| 4,338,244 | 7/1982 | Hinsken et al. | 524/109 |
| 4,581,406 | 4/1986 | Hedberg et al. | 524/520 |
| 4,610,929 * | 9/1986 | Mosser | 428/421 |
| 5,015,693 | 5/1991 | Duchesne et al. | 525/187 |
| 5,059,648 * | 10/1991 | Fukushima | 524/376 |
| 5,175,312 | 12/1992 | Dubs et al. | 549/307 |
| 5,308,899 | 5/1994 | Michaelis | 524/109 |
| 5,317,051 * | 5/1994 | Harashige | 524/310 |
| 5,422,415 | 6/1995 | Michaelis | 128/85 |
| 5,451,625 * | 9/1995 | Fukushi | 524/330 |
| 5,459,187 | 10/1995 | Taylor et al. | 524/275 |
| 5,516,920 | 5/1996 | Nesvadba et al. | 549/307 |
| 5,534,572 | 7/1996 | Taylor et al. | 524/275 |
| 5,550,193 | 8/1996 | Chiu et al. | 525/199 |
| 5,624,978 * | 4/1997 | Soltwedel | 523/402 |
| 5,658,671 * | 8/1997 | Fukushi | 524/154 |
| 5,674,931 * | 10/1997 | Gallagher | 524/414 |

FOREIGN PATENT DOCUMENTS 961998  1/1975  (CA) ..................................... 400/67

OTHER PUBLICATIONS

Westover, R.F., "Melt Extrusion", *Encyclopedia of Polymer Science & Technology*, vol. 8, John Wiley & Sons, (1968), pp. 573–581.

Rudin, A., Worm, A.T., Blacklock, J.E., "Fluorocarbon Elastomer Aids Polyolefin Extrusion", *Plastics Engineering*, Mar. 1986, pp. 63–66.

DeSmedt, C. & Nam, S., "The Processing Benefits of Fluoroelastomer Application in LLDPE", *Plastics and Rubber Processing and Applications*, 8, No. 1, (1987), pp. 11–16.

* cited by examiner

Primary Examiner—Paul R. Michl
(74) Attorney, Agent, or Firm—James V. Lilly; Dean M. Harts

(57) ABSTRACT

The extrusion of polymeric materials, especially thermoplastic polymeric materials, requires a number of physical attributes in the polymer to be controlled during extrusion to effect desirable surface characteristics on the extruded polymer. Extrusion additives have been provided for the improvement of these attributes and characteristics. The present invention describes an additive system for extrudable thermoplastic polymers, extrudable polymer compositions containing the additive system, and extrusion processes using polymers containing the additive system of this invention. The extrusion additive of the present invention comprises:

(i) a fluorocarbon polymer,
(ii) a poly(oxyalkylene) polymer,
(iii) magnesium oxide, and
(iv) optionally a stabilizer.

The extrudable composition of the invention comprises:

(A) an extrudable polymer (e.g., a predominant amount, such as at least 50% by weight of solids), and
(B) an effective amount of the stabilized processing aid (extrusion additive).

31 Claims, No Drawings

POLYMER PROCESSING ADDITIVE HAVING IMPROVED STABILITY

BACKGROUND OF THE INVENTION

1. Field of the Invention

This invention relates to a stabilized polymer processing additive system, to thermoplastic polymers having improved extrusion characteristics that employ the stabilized system, and to an extrusion process that employs the additive system.

2. Background of the Art

Extrusion of polymeric materials in the formation and shaping of articles is a major segment of the plastic or polymeric articles industry. Various materials from fibers, filaments, films, sheeting, tubes, structural elements, ducts, inserts, layered articles, and other articles having a defined cross-section can be readily and inexpensively made by extrusion processes. The fundamental extrusion process requires that a material in a fluid or fluidizable state is forced through an outlet and that the material is then converted into a non-fluid state. When the conversion from a fluid to a non-fluid state is performed in a sufficiently rapid time (with respect to the ability of the extruded material to maintain its general shape and appearance), the non-fluid article will retain a cross-section shape with the appearance of the edges of the outlet. During extrusion processes, one of the critical areas of interaction which may control quality of the article and performance of the extrusion process is the interaction of the fluid material with the extrusion outlet, often in the form of a slit, hole, opening, or other shaped outlet. The structural element which provides the physical outlet is usually referred to as a die or die head.

Westover, R. F., "Melt Extrusion", *Encyclopedia of Polymer Science and Technology*, Vol. 8, John Wiley & Sons, (1968) pp. 573–581 states that for any polymer there is a certain critical shear rate above which the surface of the extrudate becomes rough and below which the extrudate will be smooth. He further states that in order to achieve the highest possible flow rate from the extruder and to achieve the most uniform extrudate cross section the processor must control extrudate roughness or distortion. Some of the various types of extrudate roughness and distortion observed in high and low density polyethylenes are described in Rudin, A., Worm, A. T., Blacklock J. E., "Fluorocarbon Elastomer Aids Polyolefin Extrusion," *Plastics Engineering*, March 1986, pp. 63–66. Rudin et al. state that for a given set of processing conditions and die geometry, a critical shear stress exists above which polyolefins like linear low-density polyethylene (LLDPE), high-density polyethylene (HDPE), and polypropylene suffer from melt defects. At low shear rates, defects may take the form of "sharkskin", a loss of surface gloss, which in more serious manifestations, appears as ridges running more or less transverse to the extrusion direction. At higher shear rate the extrudate can undergo "continuous melt fracture" becoming grossly distorted. At rates lower than those at which continuous melt fracture is first observed, LLDPE and HDPE can also suffer from "cyclic melt fracture", in which the extrudate surface varies from smooth to rough. These types of problems may also occur in any other class of extrudable polymer besides polyolefins, including, but not limited to polyacrylates, polyamides, polycarbonates, polyvinyl resins (polyvinyl chloride, polyvinylidene chloride, polyvinyl esters, polyvinyl ethers, polyvinyl alcohol, and copolymers thereof), polytetrafluorethylene, polyesters, and the like, including copolymers thereof. The authors (Rudin, A., Worm, A. T., Blacklock J. E.) state that lowering the shear stress by adjusting the processing conditions or changing the die can avoid these defects to a certain extent, but not without creating a whole new set of problems. For example, extrusion at a higher temperature can result in weaker bubble walls in tubular film extrusion, and a wider die gap can affect film orientation. The authors state that the use of fluorocarbon elastomer processing aids can permit the operation of extruders with narrower die gaps and lower melt temperatures. Others have also described the use of fluorocarbon elastomers as processing aids, see for example, De Smedt, C. and Nam, S., "The Processing Benefits of Fluoroelastomer Application in LLDPE," *Plastics and Rubber Processing and Applications*, 8, No. 1, (1987), pp. 11–16; U.S. Pat. Nos. 3,125,547 (Blatz), and 4,581,406 (Hedberg et al).

The use of polyethylene glycol as an extrusion processing aid has been described. For example, U.S. Pat. No. 4,013,622 (DeJuneas et al.) discloses the use of polyethylene glycol to reduce the incidence of breakdown of polyethylene in the extruder, and Canadian Pat. No. 961,998 (Hancock et al.) discloses the use of anti-oxidant-stabilized, polyolefin-based film extrusion compounds and polyalkylene glycol to prevent gel streak formation during extrusion.

U.S. Pat. No. 5,015,693 (Duchesne et al) provides an extrudable composition comprising (A) thermoplastic hydrocarbon polymer, e.g., polyethylene, as the major or predominant component of the composition, (B) poly(oxyalkylene) polymer, and (C) fluorocarbon polymer.

The poly(oxyalkylene) polymer and the fluorocarbon polymer are present in the extrudable composition in such relative proportions and at concentrations which, in combination or in concert, are sufficient to reduce melt defects, i.e., sharkskin, continuous melt fracture and cyclic melt fracture.

U.S. Pat. No. 5,459,187 (Goyal et al) describes polyolefin compositions having good extrusion characteristics comprising a fluoropolymer, one or more of a low molecular weight $C_{1-4}$ alkyl ethers of a poly-$C_{2-4}$ alkylene oxide, and a metal oxide, the weight ratio of the ether to the fluoropolymer being less than 1:1. The diclosed metal oxides on column 3 include a weak metal base comprising a metal oxide of an alkaline earth or transition metal or hydrotalcite $(Mg_6Al_2(OH)_{16}CO_3\text{-}4H_2O)$. No clearly stated purpose is disclosed for the use of the metal oxide or hydrotalcite.

The extrusion additives are often incorporated into thermoplastic hydrocarbon polymers by forming a master batch of the two. Such master batches are often prepared at relatively high temperatures under aerobic conditions. This can result in degradation of one or more of the components of the master batch and a resulting loss of efficiency of the processing additive.

It has been found that the additives disclosed in U.S. Pat. No. 5,459,187, do not stabilize the extrudable hydrocarbon polymer composition against oxidative degradation as shown hereinafter.

SUMMARY OF THE INVENTION

The present invention overcomes the disadvantages of the prior art and provides a stable polymer processing additive system, an extrudable polymer composition, and an extrusion process. The stable polymer processing additive system is also referred to herein as the extrusion additive or the additive system.

The extrusion additive of the present invention comprises:

(i) a fluorocarbon polymer, (ii) a poly(oxyalkylene) polymer,
(iii) magnesium oxide, and, optionally
(iv) a stabilizer, e.g., one or more antioxidants.

The fluorocarbon polymer and the poly(oxyalkylene) polymer are present at a level sufficient to be effective. That is, the fluorocarbon polymer and the poly(oxyalkylene) polymer are present at relative proportions and at concentrations which are sufficient to reduce melt defects in the extruded part.

Generally, the fluorocarbon polymer and the poly (oxyalkylene) polymer are present in the extrusion additive in a weight ratio of 1/0.2 to 1/1 5 (preferably in a ratio of 1/0.6 to 1/10 and most preferably in a ratio of 1/1 to 1/10). The combination of fluorocarbon polymer and poly (oxyalkylene) polymer present in the extrusion additive preferably comprises from 50 to 99.95 percent by weight of the additive, more preferably from 55 to 99.9 weight percent and most preferably from 85 to 96 weight percent. The magnesium oxide is present in levels of at least 0.05 percent by weight of solids in the extrusion additive. Preferably the magnesium oxide is present at from about 0.10% to 10% by weight solids, and most preferably from 1 to 5% by weight solids in said extrusion additive. The optional stabilizer may be present at a level of from 0 to 40 weight percent of the extrusion additive, preferably from 1 to 35 weight percent, and most preferably from about 1 to 10 weight percent of the total solids composition in the extrusion additive. The extrusion additive system may further comprise other components such as adjuvants normally added to thermoplastic hydrocarbon polymers. The concentration of such other components in extrusion additive can vary depending upon the processor's requirements, but generally, the fluorocarbon polymer and poly(oxyalkylene) polymer will be the major or predominant component of the extrusion additive system.

The extrudable polymer composition of the invention comprises:
(A) an extrudable polymer (e.g., a predominant amount, such as at least 50% by weight of solids), and
(B) an effective amount (e.g., up to 50% by weight) of the extrusion additive.

The extrudable polymer composition comprises a majority (i.e., 50% by weight or more) of the extrudable polymer, most commonly a hydrocarbon polymer, and an effective amount of the additive system. As used herein, the extrudable composition includes both masterbatches and final compositions. The level of the additive system employed in the extrudable composition may vary widely and the exact amount is dependent upon the desired processing characteristics desired. Preferably the additive system comprises at least about 0.001 weight percent to about 10 weight percent of the extrudable polymer although greater or lesser amounts may be used. More preferably the stabilized processing additive comprises at least about 0.005 weight percent of the extrudable polymer and most preferably from 0.005 to 0.7 weight percent of the extrudable polymer. When the extrudable composition is a master batch, the level of additive system used is typically high, i.e., greater than 0.1 weight percent of the extrudable polymer, and typically from 0.1 to 0.7 weight percent of the extrudable polymer. When the extrudable composition is a final product (polymer pellet, film, extruded article), the level of stabilized processing additive present is typically 0.2 weight percent or less of the extrudable polymer and typically from 0.005 to 0.2 weight percent or less of the extrudable polymer.

The extrusion process of the invention comprises the steps of:
(A) providing a predominant of an extrudable thermoplastic polymer and an effective amount of the extrusion additive,
(B) admixing the extrusion additive with the extrudable thermoplastic polymer, and
(C) extruding the admixture.

The extrudable polymer and extrusion additive can be admixed in a variety of ways. For example, they can be combined in a Banbury mixer or in any type of mixing extruder. Generally, they are mixed at a temperature above the melting point of the extrudable polymer to facilitate uniform distribution of the extrusion additive throughout the polymer.

The components of the extrusion additive can each be individually added or they can be first combined together and then added to the polymer. Additionally, the individual components can be individually coated from solution onto the thermoplastic polymer to create master batches of coated polymer which are then dry blended with an appropriate quantity of the uncoated polymer to achieve the desired concentrations of each of the individual components in the extrudable composition.

DETAILED DESCRIPTION OF THE INVENTION

The present invention is effective in reducing melt defects by delaying the onset of melt defects in extrudable thermoplastic polymers to higher extrusion shear rates than could be achieved using the same level of the fluorocarbon polymer alone. It has also been observed that the present invention permits the extruder to equilibrate and produce melt-defect-free extrudate in less time than would be required for an extrudate containing the same level of fluorocarbon polymer alone at the same extrusion conditions. Furthermore, it has been found that the additive system of the invention is stabilized against the negative effects of oxidative degradation during aerobic processing in high viscosity matrices. This enables the additive system to accomplish the same result achieved by an extrusion additive system of the prior art.

The following discussion will further describe the present invention.

A. The Extrudable Polymer

The extrusion additive of the present invention may be used with any extrudable thermoplastic polymer including those mentioned above in the Background of the Invention and includes hydrocarbon polymers and fluorine-containing polymers. The particular extrudable polymer selected for use will depend upon the application or desired properties of the finished product.

As used herein the term "hydrocarbon polymers" refers to polymers and polymeric materials having fewer than 10 percent of their carbon-bonded hydrogen atoms replaced with fluorine atoms. The term "fluorine-containing polymers" refers to polymers and polymeric materials having 10 percent or more of their carbon-bonded hydrogen atoms replaced with fluorine atoms.

The extrudable polymers also include blends of one or more hydrocarbon polymers with one or more other hydrocarbon polymers or copolymers, blends of one or more fluorine-containing polymers with one or more other fluorine-containing polymers or copolymers, blends of hydrocarbon polymers or copolymers with fluorine-containing polymers or copolymers, and blends of any of the above containing conventional adjuvants such as light stabilizers, fillers, antiblocking agents and pigments.

Hydrocarbon polymers useful in the invention include any of a number of well known polymers. Preferred hydrocarbon polymers include thermoplastic polymers such as polyamides, polyimides, polyurethanes, polyolefins, polystyrenes, polyesters, polycarbonates, polyketones, polyureas, polyvinyl resins, polyacrylates and polymethacrylates.

Polyamides useful as the hydrocarbon polymer are generally commercially available. For example, polyamides such as any of the well-known nylons are available from a number of sources. Particularly preferred polyamides are nylon-6, nylon-6,6, nylon-11, or nylon-12. It should be noted that the selection of a particular polyamide material should be based upon the physical requirements of the particular application for the resulting article. For example, nylon-6 and nylon-6,6 offer higher heat resistant properties than nylon-11 or nylon-12, whereas nylon-11 and nylon-12 offer better chemical resistant properties. In addition to those polyamide materials, other nylon materials such as nylon-6, 12, nylon-6,9, nylon-4, nylon-4,2, nylon-4,6, nylon-7, and nylon-8 may also be used. Ring containing polyamides, e.g., nylon-6,T and nylon-6,1, may also be used. Polyether containing polyamides, such as PEBAX polyamides (Atochem North America, Philadelphia, Pa.), may also be used.

Useful polyurethane polymers include aliphatic, cycloaliphatic, aromatic, and polycyclic polyurethanes. These polyurethanes are typically produced by reaction of a polyfunctional isocyanate with a polyol according to well known reaction mechanisms. Useful diisocyanates for employment in the production of a polyurethane include dicyclohexylmethane-4,4'-diisocyanate, isophorone diisocyanate, 1,6-hexamethylene diisocyanate, cyclohexyl diisocyanate, and diphenylmethane diisocyanate. Combinations of one or more polyfunctional isocyanates may also be used. Useful polyols include polypentyleneadipate glycol, polyetramethylene ether glycol, polyethylene glycol, polycaprolactone diol, poly-1,2-butylene oxide glycol, and combinations thereof. Chain extenders, such as butanediol or hexanediol, may also optionally be used in the reaction. Commercially available urethane polymers useful in the present invention include: PN-04 or 3429 from Morton International, Inc., Seabrook, N.H., and X-4107 from B.F. Goodrich Company, Cleveland, Ohio.

Polyolefins represent a class of extrudable polymers that are particularly useful in the practice of the present invention. Useful polyolefins include the homopolymers and copolymers of olefins, as well as copolymers of one or more olefins and up to about 30 weight percent, but preferably 20 weight percent or less, of one or more monomers which are copolymerizable with such olefins, e.g., vinyl ester compounds such as vinyl acetate. Said olefins have the general structure $CH_2=CHR$, where R is a hydrogen or an alkyl radical, and generally, the alkyl radical contains not more than 10 carbon atoms and preferably one to four carbon atoms. Representative olefins are ethylene, propylene, and butene-1. Representative monomers which are copolymerizable with said olefins include 1-butene, 1-octene, 1-hexene, 4-methyl-1-pentene, propylene, vinyl ester monomers such as vinyl acetate, vinyl propionate, vinyl butyrate, vinyl chloroacetate, vinyl chloropropionate, acrylic and alpha-alkyl acrylic acid monomers, and their alkyl esters, amides, and nitriles such as acrylic acid, methacrylic acid, ethacrylic acid, methyl acrylate, ethyl acrylate, N,N-dimethyl acrylamide, methacrylamide, acrylonitrile, vinyl aryl monomers such as styrene, o-methoxystyrene, p-methoxystyrene, and vinyl naphthalene, vinyl and vinylidene halide monomers such as vinyl chloride, vinylidene chloride, vinylidene bromide, alkyl ester monomers of maleic and fumaric acid such as dimethyl maleate, diethyl maleate, vinyl alkyl ether monomers such as vinyl methyl ether, vinyl ethyl ether, vinyl isobutyl ether, 2-chloroethyl vinyl ether, and vinyl pyridine monomers. N-vinyl carbazole monomers, and N-vinyl pyrolidine monomers.

The extrudable hydrocarbon polymers also include the metallic salts of said olefin copolymers, or blends thereof, which contain free carboxylic acid groups. Illustrative of the metals which can be used to provide the salts of said carboxylic acid polymers are the one, two and three valence metals such as sodium, lithium, potassium, calcium, magnesium, aluminum, barium, zinc, zirconium, beryllium, iron, nickel and cobalt. Representative examples of polyolefins useful in this invention are polyethylene, polypropylene, polybutene-1, poly(3-methylbutene), poly (4-methylpentene) and copolymers of ethylene with propylene, butene-1, hexene-1, octene-1, decene-1, 4-methyl-1-pentene and octadecene-1.

Representative blends of polyolefins useful in this invention are blends containing polyethylene and polypropylene, low-density polyethylene and high-density polyethylene, and polyethylene and olefin copolymers containing said copolymerizable monomers, some of which are described above, e.g., ethylene and acrylic acid copolymers; ethyl and methyl acrylate copolymers; ethylene and ethyl acrylate copolymers; ethylene and vinyl acetate copolymers; ethylene, acrylic acid, and ethyl acrylate copolymers, and ethylene, acrylic acid, and vinyl acetate copolymers.

The preferred polyolefins are homopolymers of ethylene and propylene and copolymers of ethylene and 1-butene, 1-hexene, 1-octene, 4-methyl-1-pentene, propylene, vinyl acetate, and methyl acrylate. A preferred polyolefin is a homopolymer or copolymer or blend with linear low density polyethylene (LLDPE).

The polyolefins may be polymerized using Ziegler-Natta catalysts, heterogeneous catalysts and metallocene catalysts.

Polyacrylates and polymethacrylates useful as the substantially non-fluorinated polymer include, for example, polymers of acrylic acid, methyl acrylate, ethyl acrylate, acrylamide, methylacrylic acid, methyl methacrylate, n-butyl acrylate, and ethyl acrylate, to name a few. As mentioned above, other useful substantially extrudable hydrocarbon polymers include polyesters, polycarbonates, polyketones, and polyureas. These materials are generally commercially available, for example, SELAR™ polyester (DuPont, Wilmington, Del.); LEXAN polycarbonate (General Electric, Pittsfield, Mass.); KADEL polyketone (Amoco, Chicago, Ill.); and SPECTRIM™ polyurea (Dow Chemical, Midland, Mich.).

The degree of crystallinity of the hydrocarbon polymer or copolymer can vary. The polymer may, for example, be a semi-crystalline high density polymer such as high density polyethylene or may be an elastomeric copolymer such as a copolymer of ethylene and propylene. Carboxyl, anhydride, or imide functionalities may be incorporated into the hydrocarbon polymer within the present invention, by polymerizing or copolymerizing functional monomers, for example, acrylic acid or maleic anhydride, or by modifying a polymer after polymerization, for example, by grafting, by oxidation or by forming ionomers. These include, for example, acid modified ethylene vinyl acetates, acid modified ethylene acrylates, anhydride modified ethylene acrylates, anhydride modified ethylene vinyl acetates, anhydride modified polyethylenes, and anhydride modified polypropylenes. The carboxyl, anhydride, or imide functional polymers useful as the hydrocarbon polymer are generally commercially available. For example, anhydride modified polyethylenes are commercially available from DuPont, Wilmington, Del., under the trade designation BYNEL coextrudable adhesive resins.

Useful fluorine-containing polymers include crystalline or partially crystalline polymers such as copolymers of tetrafluoroethylene with one or more other monomers such as perfluoro(methyl vinyl)ether, hexafluoropropylene, perfluoro(propyl vinyl)ether; copolymers of tetrafluoroethylene with ethylenically unsaturated hydrocarbon monomers such as ethylene, propylene, etc.

Still other fluorine-containing polymers useful in the invention include those based on vinylidene fluoride such as polyvinylidene fluoride; copolymers of vinylidene fluoride with one or more other monomers such as hexafluoropropylene, tetrafluoroethylene, ethylene, propylene, etc. Still other useful fluorine-containing extrudable polymers will be known to those skilled in the art as a result of this disclosure.

The extrudable thermoplastic polymers may be used in the form of powders, pellets, granules, or any other extrudable form.

B. The Extrusion Additive

1. The Fluoropolymer

The fluorocarbon or fluorinated polymers useful in the additive system of this invention are generally homopolymers and copolymers of fluorinated olefins having a fluorine atom-to-carbon atom ratio of at least 1:2, preferably at least 1:1. Homopolymers which can be used are those derived for example, from vinylidene fluoride and vinyl fluoride. Copolymers of fluorinated olefins can be those derived, for example, from vinylidene fluoride, and one or more additional olefins, which can be fluorinated, e.g., hexafluoropropylene, or non-fluorinated, e.g., propylene.

Preferred fluorocarbon polymers are copolymers of vinylidene fluoride with at least one terminally unsaturated fluoromonoolefin containing at least one fluorine atom on each double-bonded carbon atom, each carbon atom of said fluoromonoolefin being substituted only with fluorine, chlorine, bromine, hydrogen or lower fluoroalkyl (e.g., perfluoroalkyl having one to four carbon atoms) or fluoroalkoxy radical, (e.g., perfluoroalkoxy having one to four carbon atoms). Preferred comonomers with vinylidene fluoride are perfluoropropylene, tetrafluoroethylene, chlorotrifluoroethylene, and pentafluoropropylene. Particularly preferred are the fluorinated polymers produced by copolymerizing perfluoropropylene and vinylidene fluoride, as described in U.S. Pat. Nos. 3,051,677 (Rexford) and 3,318,854 (Honn et al.) and those polymers produced by copolymerizing perfluoropropylene, vinylidene fluoride and tetrafluoroethylene as described in U.S. Pat. No. 2,968,649 (Pailthorp et al.). The elastomeric copolymers of perfluoropropylene and vinylidene fluoride having between about 15 and about 50 mole percent perfluoropropylene, optionally with the addition of up to 5 to 30 mole percent tetrafluoroethylene, are particularly useful.

2. The Poly(oxyalkylene) Polymer

The poly(oxyalkylene) polymers useful in this invention can include poly(oxyalkylene) polyols and their derivatives, and a useful class of poly(oxyalkylene) polymers can be represented by the general formula $$A[(OR^1)_x OR^2]_y \qquad \text{I}$$

where A is an active hydrogen-free residue of a low molecular weight, initiator organic compound having a plurality of active hydrogen atoms (e.g., 2 or 3), such as a polyhydroxyalkane or polyether polyol, e.g., ethylene glycol, glycerol, 1.1.1-trimethylol propane, and poly(oxypropylene) glycol; y is 2 or 3; the $(OR^1)_x$ is a poly(oxyalkylene) chain having a plurality (e.g., x is from 5 to about 500) of oxyalkylene groups. $(OR^1)$, wherein the $R^1$ radicals can be the same or different, and are selected from the group consisting of $C_1$ to $C_5$ alkylene radicals and preferably $C_2$ or $C_3$ alkylene radicals; and x is the number of oxyalkylene units. Said poly(oxyalkylene) chain can be a homopolymer chain, e.g., poly(oxyethylene) or poly(oxypropylene), or can be a chain of randomly distributed (i.e., a heteric mixture) oxyalkylene groups, e.g., a copolymer of $-OC_2H_4$ and $-OC_3H_6$ units, or can be a chain having alternating blocks or backbone segments or repeating oxyalkylene groups, e.g., a polymer comprising $-OC_2H_4)_a$ and $-OC_3H_6)_b$ blocks, where a+b= x, and x is about 5 to about 500 and preferably about 10 to 300. $R^2$ is H or an organic radical such as alkyl, aryl or combination thereof such as aralkyl or alkaryl, and may contain heteroatoms such as O or N. For example, $R^2$ can be methyl, butyl, phenyl, benzyl, and acyl groups such as acetyl ($CH_3CO-$), benzoyl ($C_6H_5CO-$) and stearoyl ($C_{17}-H_{35}CO-$).

Representative poly(oxyalkylene) polymer derivatives can include poly(oxyalkylene) polyol derivatives wherein the terminal hydroxy groups have been partly or fully converted to ether derivatives, e.g., methoxy groups, or ester derivatives, e.g., stearate groups, ($C_{17}-H_{35}COO-$). Other useful poly(oxyalkylene) derivatives are polyesters, e.g., prepared from dicarboxylic acids and poly(oxyalkylene) glycols. Preferably, the major proportion of the poly(oxyalkylene) polymer derivative by weight will be the repeating oxyalkylene groups, (OR). Said poly(oxyalkylene) polyols and their derivatives can be liquids or solids at room temperature and have a molecular weight of at least 200 and preferably a molecular weight of about 400 to 20,000 or higher, e.g., 200,000 or more.

Poly(oxyalkylene) polyols useful in this invention include those sold under the trademark CARBOXWAX™, such as CARBOWAX™3350, $H(OC_2H_4)_nOH$, where n is about 76, and those sold under the trademark PLURONIC™, e.g., PLURONIC™ F-77, $H(OC_2H_4)_d[OCH(CH_3)CH_2]_e(OC_2H_4)_fOH$, where d+f is about 108, and e is about 35.

Preferred poly(oxyalkylene) polymers are poly(oxyethylene) glycols, often referred to as polyethylene glycols, having a molecular weight of about 1000 to 20,000.

3. The Magnesium Oxide

The magnesium oxide used in the invention has been clearly demonstrated to have an influence on the performance of the present invention. The magnesium oxide is preferably in a form with less than 10% (by molar contribution) of other metals, transition metals, alkaline metals or the like. That is, the magnesium oxide should comprise at least 90% by molar contribution (of elements other than C, O and H, and preferably other than O and H) of magnesium. It is later shown by examples that particles comprising $(Mg_6Al_2(OH)_{16}CO_3-4H_2O)$ do not perform as efficiently as does the magnesium oxide (90–100% magnesium and oxygen). The specific effect of the benefit has not been absolutely tied to the effect of the metal or the absence of the carbonate contribution, but the effect is the possible effect of one or more of these materials. Therefore another possible characterization of the magnesium oxide is the absence of carbonates, as represented by comprising at least 90% by molar contribution of elements other than C, O and H. The particle size of the magnesium oxide in the composition may vary within wide ranges, but the generally preferred range is from about 0.01 to 25 micrometers.

4. The Stabilizer

Stabilizers are useful in the present invention to counteract the effects of thermal oxidation, chain scission, photo-oxidative degradation and other forms of radiation degradation such as electron beam and gamma-radiation. They are also useful in neutralizing any free radicals that may be generated by the degradation process. A wide variety of stabilizers are useful in the invention. They include phenols, hindered phenols, phosphorus compounds, and benzofuranone materials. Preferably, the stabilizer comprises a blend of the phenolic and one or more of the other stabilizers. Particularly preferred are blends of phenolic stabilizers with phosphite stabilizers and, optionally, benzofuranone stabilizers, especially the benzofuran-2-one (optionally called "lactones") stabilizers.

These stabilizers are generally known in the art. See for example U.S. Pat. Nos. 4,325,863; 4,338,244; 5,175,312; 5,308,899; 5,422,415 and 5,516,920. These patents each describe these classes of stabilizer. The stabilizers may be used in a wide range of amounts, from the minimum amount where protection against oxidation is first detected to much higher amounts.

The extrusion additive can be prepared by blending the components using any of the means conveniently employed to add adjuvants to polymers. Thus, the fluorocarbon polymer, poly(oxyalkylene) polymer, magnesium oxide and any stabilizers and other adjuvants can be dry blended. Alternatively, the ingredients can be combined by melt blending the poly(oxyalkylene) polymer and the stabilizer, if employed, solidifying the blend and forming particulate of it followed by dry blending the remaining ingredients with the blend. The resulting additive can then be added to the extrudable hydrocarbon polymer as disclosed above.

This invention is useful in the extrusion of thermoplastic polymers, especially hydrocarbon polymers, which includes, for example, extrusion of films, extrusion blow molding, injection molding, pipe, wire or cable extrusion, and fiber production.

The following examples are offered to assist in a better understanding of the present invention and are not to be unnecessarily construed to limit the scope of the invention.

PPA-1 is a polymer processing additive which comprises 1 part by weight of a copolymer of vinylidene fluoride and hexafluoropropylene containing about 10 percent by weight of inorganic partitioning agents (25 talc [which is a magnesium silicate], 0.67% calcium carbonate, and 0.67% amorphous silica by weight) and 2 parts by weight of a polyethylene glycol (such as Carbowax™ 8000, PEG-4).

PPA-2 is the same as PPA-1 except for the presence of 2% by weight of the copolymer of each of the antioxidant agents Irganox™ 1010 (Tetrakis [methylene(3,5-di-tert-butyl-4-hydroxyhydrocinnamate)]methane) and Irgafos™ 168 (Tris (2,4-di-tert-butylphenyl)phosphite)(both available from Ciba Specialty Chemicals Corp., Tarrytown, N.Y.).

EXAMPLE 1 AND COMPARATIVE EXAMPLES C1–C5

To demonstrate the performance of the polymer processing additive system of the invention in providing stability against oxidative degradation, the amount of released formaldehyde during the preparation of lab prepared PPA concentrates was measured using an Interscan™ Voltametric formaldehyde specific sensor.

A series of processing additives were prepared by dry blending PPA-1 with differing adjuvants. The resultant dry blended processing additives were then added to low density polyethylene (0.7 melt index) in a laboratory Banbury mixer. The processing additive comprised 5% by weight of the combined weight of the total composition. The resulting composition was mixed for four minutes at 140° C. in a Haake melt mixer. The amount of formaldehyde generated was measured and is reported in Table 1. Table 1 also shows the amount of each adjuvant used in the various processing additives tested. The quantities of the additives are reported in parts per million (ppm) of the low density polyethylene.

TABLE 1

| Example No. | PPA-1 | ZnO (ppm) | CaSt$^{(1)}$ (ppm) | DHT$^{(2)}$ (ppm) | MgO (ppm) | B-225$^{(3)}$ (ppm) | Formaldehyde Released (ppm) |
|---|---|---|---|---|---|---|---|
| C1 | 5% | — | — | — | — | — | >15 |
| C2 | 5% | — | — | — | — | 2000 | 1.0 |
| 1 | 5% | — | — | — | 2000$^{(4)}$ | — | 0 |
| C3 | 5% | — | 2000 | — | — | — | >15 |
| C4 | 5% | 2000 | — | — | — | — | >15 |
| C5 | 5% | — | — | 2000 | — | — | >15 |

$^{(1)}$Calcium Stearate
$^{(2)}$Hydrotalcite
$^{(3)}$1:1 blend of Irganox ™ 1010 and Irgafos ™ 168 available from Ciba Specialty Chemicals Corp.
$^{(4)}$Browning of polyolefin noted The data in Table 1 show that the additive system of the invention stabilized the extrudable composition as it significantly reduced the release of formaldehyde during preparation of masterbatches of a processing additive and a hydrocarbon polymer under aerobic conditions. The other metal oxides like zinc oxide as well as the use of calcium stearate or hydrotalcite ($Mg_6Al_2(OH)_{10}CO_3.4H_2O$) did not show the same performance as magnesium oxide.

EXAMPLES 2–5 AND COMPARATIVE EXAMPLE C6

A series of processing additives were prepared by dry blending PPA-1, a combination of stabilizers (i.e., antioxidants), and MgO. A portion of each of the resulting additives were combined with low density polyethylene as described in Example 1 and Comparative Examples C1–C5. After mixing for five minutes at 140° C. the amount of formaldehyde released was determined. A portion of each of the additives was separately heated to 140° C. for 60 minutes. The amount of formaldehyde released from the heat treated additives was measured. The results are shown in Table 2. The symbol "%" means % by weight in the additive composition. The symbol "ppm" means parts per million.

TABLE 2

| Example No. | PPA-1 (%) | I-1010/168 (%/%) | MgO (%) | Formaldehyde Released From Heat treated PPA (ppm) | Formaldehyde Released From Masterbatch (ppm) |
|---|---|---|---|---|---|
| C6 | 98 | 1/1 | 0 | 2.5 | 0.4 |
| 2 | 97.8 | 1/1 | 0.2 | 2.5 | 0.2 |
| 3 | 97.5 | 1/1 | 0.5 | 2.2 | 0.2 |
| 4 | 97 | 1/1 | 1 | 3.6 | 0.2 |
| 5 | 96 | 1/1 | 2 | 3.3 | 0.1 |

The data in Table 2 show that the additive system of the invention reduced the amount of formaldehyde released from a master batch prepared under aerobic mixing conditions thereby providing a stabilized extrudable composition.

EXAMPLES 6–7 AND COMPARATIVE EXAMPLE C6

A series of master batch compositions comprising 5% by weight processing additive and 95% by weight low density polyethylene (0.7 melt index) were prepared in an 80 liter Banbury mixer. The various ingredients of the processing additive systems were dry blended together. One-half of the low density polyethylene was added to the Banbury mixer and mixed after which the additive system was added to the Banbury. After mixing these initial charges until a visually uniform mixture was achieved, the remaining low density polyethylene was added. The entire charge was then mixed until uniform. The blends were heated to various temperatures. The amount of formaldehyde generated at each temperature was measured by FTIR techniques. The composition of the processing additives and the formaldehyde generated are set out in Table 3.

TABLE 3

| | Additive Composition | | | Released Formaldehyde (ppm) | | |
|---|---|---|---|---|---|---|
| Example No. | PPA-1 (%) | I-1010/168 (%/%) | MgO (%) | 140° C. | 150° C. | 160° C. |
| 6 | 97 | 1/1 | 1 | 0.1 | 1 | 18 |
| 7 | 97.8 | 1/1 | 0.2 | 0.2 | 2 | 70 |
| C7 | 100* | 0 | 0 | 65 | 75 | 103 |

*PPA-2

The data show that the additive system of the invention significantly reduced the release of formaldehyde during aerobic processing thereby providing a stabilized extrudable composition.

EXAMPLES 8–9 AND COMPARATIVE EXAMPLES C8 –C9

A series of processing additives were prepared by dry blending the ingredients shown in Table 4. Master batch compositions were then prepared in a Haake internal mixer by combining 3%, 5% or 7% by weight of the processing additive with 97%, 95% or 93% by weight of low density polyethylene (0.,7 melt index). The torque on the mixer (in Newton-meters (Nm)) was then measured at the end of the mixing cycle. The results are shown in Table 4.

TABLE 4

| | Additive Composition | | | | Measured Torque (Nm) | | |
|---|---|---|---|---|---|---|---|
| Example No. | PPA-1 (%) | PPA-2 (%) | I-1010/168 (%/%) | MgO (%) | 3% | 5% | 7% |
| 8 | 97.5 | 0 | 1/1 | 0.5 | 31.5 | 30 | <1 |
| 9 | 96 | 0 | 1/1 | 2 | 35 | 30 | <1 |
| C8 | 0 | 100 | 0 | 0 | <1 | <1 | <1 |
| C9 | 98 | 0 | 1/1 | 0 | 35 | 30 | <1 |

The data shown in Table 4 shows that the additive compositions of the invention can be used at high levels without losing all torque. This permits a better dispersion of the additive system throughout the extrudable polymer.

EXAMPLES 10–14

A series of additive compositions according to the invention were prepared. They each comprised 96% by weight PPA-1, 2% by weight stabilizer and 2% by weight magnesium oxide. Different types of magnesium oxide were used. Each of the additive compositions was combined with low density polyethylene in a Haake mixer as described in the first example. Additionally, the amount of formaldehyde released from the additive composition alone (after heating for 5 minutes at 140° C. and after heating for 60 minutes at 140° C.) was determined. The results are given in Table 5.

TABLE 5

| | Additive Composition | | | | | | Formaldehyde Released | |
|---|---|---|---|---|---|---|---|---|
| Example No. | PPA-1 (%) | Stabilizer B-225 | Stabilizer HP2225 | MgO Y | MgO D | MgO DE | 5 Minutes @ 140° C. (ppm) | 60 Minutes @ 140° C. (ppm) |
| 10 | 96 | 2 | | | 2 | | 0.5 | 1.8 |
| 11 | 96 | 2 | | | | 2 | 0.2 | 1.2 |
| 12 | 96 | 2 | | | | 2 | 0.1 | 0.3 |
| 13 | 96 | | 2 | | 2 | | 0.2 | 0.8 |
| 14 | 96 | 2 | | | 2 | | 0.3 | 0.3 |

B-225 is a 50/50 mixture of Iraganox™ 1010 and Irgafos™ 168 available from Ciba Specialty Chemicals Corp.

HP 2225 is a 45/45/10 mixture of Irganox™ 1010/Irgafos™ 168 and benzofuran-2-one available from Ciba Specialty Chemicals Corporation.

The various forms of magnesium oxide used in these examples having the Maglite™ designation are described in the literature as follows:

| Property | Unit | D | DE | Y |
|---|---|---|---|---|
| Surface Area | m²/g | 185 | 115 | 50 |
| Part. Size Avg. | microns | 2 | 10 | 2 |
| MgO | Min. % | 90 | 97 | 94 |
| Ignition Loss | Max. % | 7.5 | 8 | 5 |
| $CO_2$ | Max. % | 0.75 | | |
| Combined Water | Max. % | 7 | | |
| CaO | Max. % | 1 | 1 | 1 |
| $SiO_2$ | Max. % | 0.35 | | 0.35 |
| Chloride | Max. % | 0.3 | 0.3 | 0.3 |

-continued

| Property | Unit | D | DE | Y |
|---|---|---|---|---|
| Sulfate | Max. % | 1 | 1 | 1 |
| $Fe_2O_3$ | Max. % | 0.05 | 0.25 | 0.05 |
| $Al_2O_3$ | Max. % | 0.13 | 0.25 | 0.13 |
| Manganese | Max. % | 0.003 | | 0.003 |
| Copper | Max. % | 0.00005 | | 0.00005 |

Iodine numbers are also provided as 100 minimum for Maglite™ D and 30–55 for Maglite™ Y. Where values are not present in the table, they were not provided by the literature.

What is claimed is:

1. An extrudable composition comprising
   (A) a predominant amount of an extrudable thermoplastic polymer selected from the group consisting of hydrocarbon polymers, polyamides, polyurethanes, polyesters, polycarbonates, polyketones, polyureas, polyacrylates and polymethacrylates, and
   (B) an amount of a stabilized processing aid effective to reduce melt defects in the extrudable thermoplastic polymer, the stabilized processing aid comprising
      (i) a fluorocarbon polymer,
      (ii) a poly(oxyakylene) polymer having the general formula:

$$A((OR^1)_xOR^2)_y$$

where A is an active hydrogen-free residue of a low molecular weight initiator compound having a plurality of active hydrogen atoms, $(OR^1)_x$ is a poly(oxyalkylene) chain in which each $R^1$ is a radical that can be the same or different and x is the number of oxyalkylene groups in the chain, each $R^2$ is H or an organic radical that can contain one or more heteroatoms, and y is 2 or 3,
      (iii) magnesium oxide, and
      (iv) optionally a stabilizer.

2. An extrudable composition according to claim 1 wherein the stabilized processing aid comprises from 0.001 to 50% by weight of solids of the extrudable polymer.

3. An extrudable composition according to claim 2 wherein the weight ratio of the fluorocarbon polymer to the poly(oxyalkylene) polymer is in the range of from 1/0.2 to 1/15.

4. An extrudable composition according to claim 3 wherein the stabilized processing aid comprises (a) from about 50 to 95% by weight of the combination of the fluorocarbon polymer and the poly(oxyalkylene) polymer, and (b) from 0.05 to 10% by weight of the MgO, and (c) up to 40% by weight of the stabilizer.

5. An extrudable composition according to claim 4 wherein the stabilized processing additive comprises (a) from about 85 to 96% by weight of the combination of the fluorocarbon polymer and the poly(oxyalkylene) polymer, and (b) from 1 to 5% by weight of the magnesium oxide, and (c) from 1 to 35% by weight of the stabilizer.

6. An extrudable composition according to claim 5 wherein the stabilizer comprises from 1 to 10% by weight of the stabilized processing aid.

7. An extrudable composition according to claim 1 wherein the stabilizer comprises at least one antioxidant.

8. An extrudable composition according to claim 7 wherein the stabilizer comprises a mixture of antioxidant compounds.

9. An extrudable composition according to claim 7 wherein the antioxidant is selected from the group consisting of phenols, hindered phenols, phosphorus compounds and benzofuranone compounds.

10. An extrudable composition according to claim 9 wherein the antioxidant comprises a mixture of phenols and phosphorous compounds.

11. An extrudable composition according to claim 2 wherein the stabilized processing aid comprises from 0.001 to 0.7% by weight of the extrudable polymer.

12. An extrudable composition according to claim 1 wherein the fluorocarbon polymer is selected from the group consisting of fluoroelastomers and fluorothermoplastics.

13. An extrudable composition according to claim 1 wherein the hydrocarbon polymer is an olefin polymer.

14. A stabilized processing aid composition that reduces melt defects in an extruded thermoplastic polymer selected from the group consisting of hydrocarbon polymers, polyamides, polyimides, polyurethanes, polyesters, polycarbonates, polyketones, polyureas, polyacrylates and polymethacrylates, the stabilized processing aid composition comprising
   (A) a fluorocarbon polymer,
   (B) a poly(oxyalkylene) polymer having the general formula:

$$A((OR^1)_xOR^2)_y$$

where A is an active hydrogen-free residue of a low molecular weight initiator compound having a plurality of active hydrogen atoms, $(OR^1)_x$ is a poly(oxyalkylene) chain in which each $R^1$ is a radical that can be the same or different and x is the number of oxyalkylene groups in the chain, each $R^2$ is H or an organic radical that can contain one or more heteroatoms, and y is 2 or 3,
   (C) magnesium oxide, and
   (D) optionally a stabilizer,
the stabilized processing aid composition comprising an amount of components (A), (B), (C) and (D) that is effective to reduce the melt defects in the extruded thermoplastic polymer.

15. A stabilized processing aid composition according to claim 14 wherein the weight ratio of the poly(oxyalkylene) polymer to the fluorocarbon polymer is effective to reduce the occurrence of melt defects during extrusion of an extrudable polymer.

16. A stabilized processing aid composition according to claim 15 wherein the weight ratio of the fluorocarbon polymer to the poly(oxyalkylene) polymer is in the range of from 1/0.2 to 1/15.

17. A stabilized processing aid composition according to claim 14 containing an effective amount of the magnesium oxide.

18. A stabilized processing aid composition according to claim 17 wherein the magnesium oxide is present in an amount of from 0.05 to 10% by weight solids of the processing aid composition.

19. A stabilized processing aid composition according to claim 14 wherein the stabilizer comprises at least one antioxidant.

20. A stabilized processing aid composition according to claim 14 wherein the stabilizer comprises a mixture of antioxidants.

21. A stabilized processing aid composition according to claim 14 wherein the antioxidant is selected from the group consisting of phenols, hindered phenols, phosphorus compounds, and benzofuranone compounds.

22. A stabilized processing aid composition according to claim 21 wherein the antioxidant comprises a mixture of phenols and phosphorus compounds.

23. A stabilized processing aid composition according to claim 14 wherein said antioxidant comprises up to 40% by weight of the stabilized processing aid.

24. A stabilized processing aid composition according to claim 23 wherein said antioxidant comprise from 1 to 10% by weight of the polymer processing aid.

25. A stabilized film of a thermoplastic polymer comprising a thin sheet of an extrudable composition according to claim 1.

26. A method of reducing melt defects during the extrusion of a thermoplastic polymer comprising the steps of:

(A) providing a predominant amount of an extrudable thermoplastic polymer selected from the group consisting of hydrocarbon polymers, polyamides, polyimides, polyurethanes, polyesters, polycarbonates, polyketones, polyureas, polyacrylates and polymethacrylates, and an amount of an extrusion additive composition effective to reduce melt defects in the extruded thermoplastic polymer, the extrusion additive composition comprising (i) a fluorocarbon polymer, (ii) a poly(oxyalkylene) polymer having the general formula:

$$A((OR^1)_x OR^2)_y$$

where A is an active hydrogen-free residue of a low molecular weight initiator compound having a plurality of active hydrogen atoms, $(OR^1)_x$ is a poly(oxyalkylene) chain in which each $R^1$ is a radical that can be the same or different and x is the number of oxyalkylene groups in the chain, each $R^2$ is H or an organic radical that can contain one or more heteroatoms, and y is 2 or 3; (iii) magnesium oxide, and (iv) optionally a stabilizer, (B) admixing the extrusion additive composition and the extrudable thermoplastic polymer to form the thermoplastic polymer composition, and (C) extruding the admixture.

27. An extrudable composition according to claim 1 wherein the stabilized processing aid consists essentially of (i) a fluorocarbon polymer, (ii) a poly(oxyalkylene) polymer, (iii) magnesium oxide, and (iv) optionally a stabilizer.

28. A stabilized processing aid composition according to claim 14 consisting essentially of (A) a fluorocarbon polymer, (B) a poly(oxyalkylene) polymer, (C) magnesium oxide, and (D) optionally a stabilizer.

29. An extrudable composition according to claim 1 wherein the hydrocarbon polymer is selected from the group consisting of homopolymers and copolymers of polyolefins, polystyrenes, the metallic salts of olefin copolymers which contain free carboxylic acid groups, and blends thereof.

30. A method of reducing melt defects according to claim 26 wherein the hydrocarbon polymer is selected from the group consisting of homopolymers and copolymers of polyolefins, polystyrenes, the metallic salts of olefin copolymers which contain free carboxylic acid groups, and blends thereof.

31. A stabilized processing aid composition according to claim 14 wherein the hydrocarbon polymer is selected form the group consisting of homopolymers and copolymers of polyolefins, polystyrenes, the metallic salts of olefin copolymers which contain free carboxylic acid groups, and blends thereof.

* * * * *